US010045287B1

(12) United States Patent
Kavuri et al.

(10) Patent No.: US 10,045,287 B1
(45) Date of Patent: Aug. 7, 2018

(54) CELLULAR SYSTEM SELECTION FREQUENCY SCAN SCOPE FOR ROAMING

(71) Applicant: Apple Inc., Cupertino, CA (US)

(72) Inventors: Lakshmi N. Kavuri, San Jose, CA (US); Jianxiong Shi, Dublin, CA (US); Srinivasan Nimmala, San Jose, CA (US); Viswanath Nagarajan, San Jose, CA (US); Yifan Zhu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/592,327

(22) Filed: May 11, 2017

(51) Int. Cl.
H04W 4/00 (2018.01)
H04W 48/18 (2009.01)
H04W 8/12 (2009.01)
H04W 48/14 (2009.01)
H04B 17/318 (2015.01)
H04W 60/04 (2009.01)
H04W 88/02 (2009.01)
H04W 84/04 (2009.01)

(52) U.S. Cl.
CPC .......... *H04W 48/18* (2013.01); *H04B 17/318* (2015.01); *H04W 8/12* (2013.01); *H04W 48/14* (2013.01); *H04W 60/04* (2013.01); H04W 84/042 (2013.01); H04W 88/02 (2013.01)

(58) Field of Classification Search
CPC ........... H04Q 7/24; H04Q 7/38; H04W 48/18; H04W 48/16; H04W 76/10; H04W 84/042; H04W 72/048; H04W 88/06; H04M 1/00; G03G 15/00; H04N 1/00; H04B 17/382; H04B 7/185; G06F 11/14; G06F 11/1451; G06F 17/30144; G06F 11/1461
USPC .......... 455/432.1, 403, 422.1, 433; 370/310; 375/316
See application file for complete search history.

(56) References Cited

U.S. PATENT DOCUMENTS

| | | | | |
|---|---|---|---|---|
| 8,433,318 | B2* | 4/2013 | Krishnamoorthy ... | H04W 48/16 455/434 |
| 2004/0192306 | A1* | 9/2004 | Elkarat ................... | H04W 8/06 455/435.2 |
| 2005/0227720 | A1* | 10/2005 | Gunaratnam ......... | H04W 48/18 455/510 |
| 2007/0004404 | A1* | 1/2007 | Buckley ................ | H04W 48/16 455/434 |
| 2007/0268877 | A1* | 11/2007 | Buckley ................ | H04W 48/18 370/338 |

(Continued)

*Primary Examiner* — Mahendra Patel
(74) *Attorney, Agent, or Firm* — Meyertons Hood Kivlin Kowert & Goetzel, P.C.; Jeffrey C. Hood; Brian E. Moore

(57) ABSTRACT

Apparatuses, systems, and methods for user equipment (UE) devices to perform more efficient frequency scans for potential base stations. According to techniques described herein, the UE may, in response to detecting that UE does not have cellular service, perform a full band scan to search for a last registered public land mobile network (PLMN) and the full band scan may discover one or more cells not associated with the last registered PLMN. The UE may populate a database with one or more parameters associated with the one or more cells and in response to not finding the last registered PLMN, perform a targeted scan limited to a set of PLMNs found during the full band scan. In some embodiments, each PLMN in the set of PLMNs may be comprised in a roaming PLMN list for an operator.

20 Claims, 4 Drawing Sheets

(56) References Cited

U.S. PATENT DOCUMENTS

| | | | |
|---|---|---|---|
| 2007/0270142 A1* | 11/2007 | Willey | H04W 48/16 455/434 |
| 2010/0015973 A1* | 1/2010 | Islam | H04W 48/16 455/434 |
| 2010/0197301 A1* | 8/2010 | Islam | H04W 24/00 455/434 |
| 2011/0177810 A1* | 7/2011 | Kim | H04W 48/18 455/432.1 |
| 2011/0256869 A1* | 10/2011 | Zhang | H04W 24/02 455/435.2 |
| 2012/0190361 A1* | 7/2012 | Shaikh | H04W 48/18 455/434 |
| 2014/0128070 A1 | 5/2014 | Ni et al. | |
| 2014/0357285 A1* | 12/2014 | Smith | H04W 48/17 455/450 |
| 2015/0056985 A1* | 2/2015 | Swaminathan | H04W 88/06 455/432.1 |
| 2015/0296391 A1* | 10/2015 | Kotkar | H04W 52/0219 370/254 |
| 2015/0341846 A1* | 11/2015 | Shi | H04W 48/16 455/434 |
| 2016/0044582 A1 | 2/2016 | Pasumarthi et al. | |
| 2016/0157150 A1* | 6/2016 | Wirtanen | H04W 48/16 455/434 |
| 2017/0353990 A1* | 12/2017 | Nair | H04W 76/19 |

* cited by examiner

US 10,045,287 B1

CELLULAR SYSTEM SELECTION FREQUENCY SCAN SCOPE FOR ROAMING

FIELD

The present application relates to wireless devices, and more particularly to an apparatus, system, and methods for improved cellular network scanning when roaming, when the last registered cellular coverage is not found, and/or when moving from one carrier cellular coverage area to another carrier cellular coverage area.

DESCRIPTION OF THE RELATED ART

Wireless communication systems are rapidly growing in usage. Further, wireless communication technology has evolved from voice-only communications to also include the transmission of data, such as Internet and multimedia content. In certain scenarios, a wireless device may use a search algorithm to acquire service with a wireless network. These search algorithms may burden device resources. Thus, improvements in the field are desired.

SUMMARY

Embodiments are presented herein of methods for wireless devices to more efficiently scan frequency bands for potential base stations while roaming and of devices configured to implement these methods. Embodiments relate to a user equipment (UE) device having at least one antenna for performing wireless communications, a radio, and a processing element coupled to the radio. The UE may perform voice and/or data communications, as well as the methods described herein.

According to the techniques described herein, the UE, or a processor of the UE (e.g., such as a baseband processor), may in response to detecting that UE does not have cellular service, perform a full band scan to search for a last registered public land mobile network (PLMN) and the full band scan may discover one or more cells not associated with the last registered PLMN. The UE may populate a database with one or more parameters associated with the one or more cells and in response to not finding the last registered PLMN, perform a targeted scan limited to a set of PLMNs found during the full band scan. In some embodiments, each PLMN in the set of PLMNs may be comprised in a roaming PLMN list for an operator.

Further, according to the techniques described herein, the UE, or a processor of the UE (e.g., such as a baseband processor), may determine that the UE does not have cellular service and further determine a last registered PLMN the UE was camped on. The UE may perform a full band scan to search for the last registered PLMN and in response to not finding the last registered PLMN, perform a targeted scan limited to a set of frequencies, that are associated with one or more PLMNs found during the full band scan. The UE may prioritize scanning of the frequencies in the set of frequencies based in part on signal strength.

In addition, according to the techniques described herein, the UE, or a processor of the UE (e.g., such as a baseband processor) may determine that the UE is in a roaming condition and perform a full band scan to search for a last registered PLMN. The full band scan may discover one or more cells not associated with the last registered PLMN and the UE, for each of the one or more cells, may populate a database with one or more parameters associated with the one or more cells. The UE may perform, in response to the last registered PLMN not being available, a targeted band scan based on the database and may determine a scope of the targeted band scan based on at least one of the one or more parameters associated with the one or more cells.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
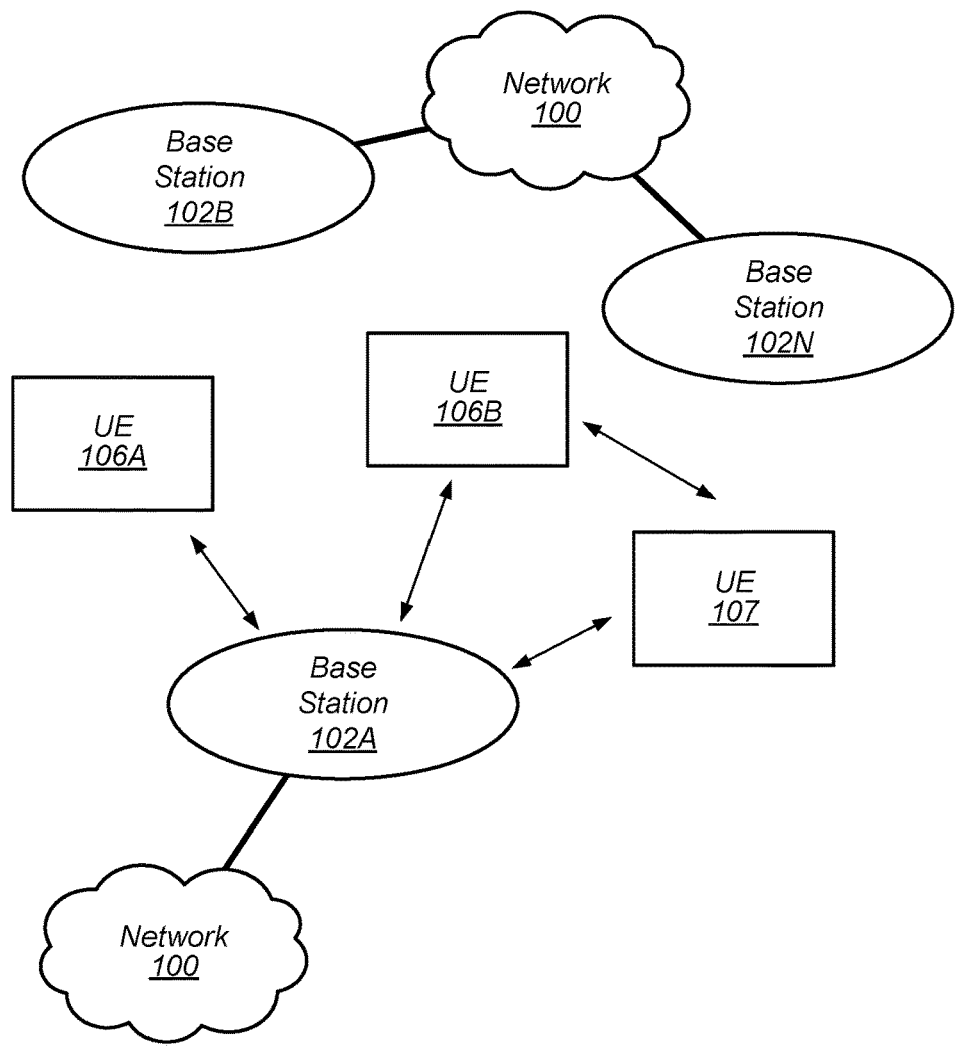
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
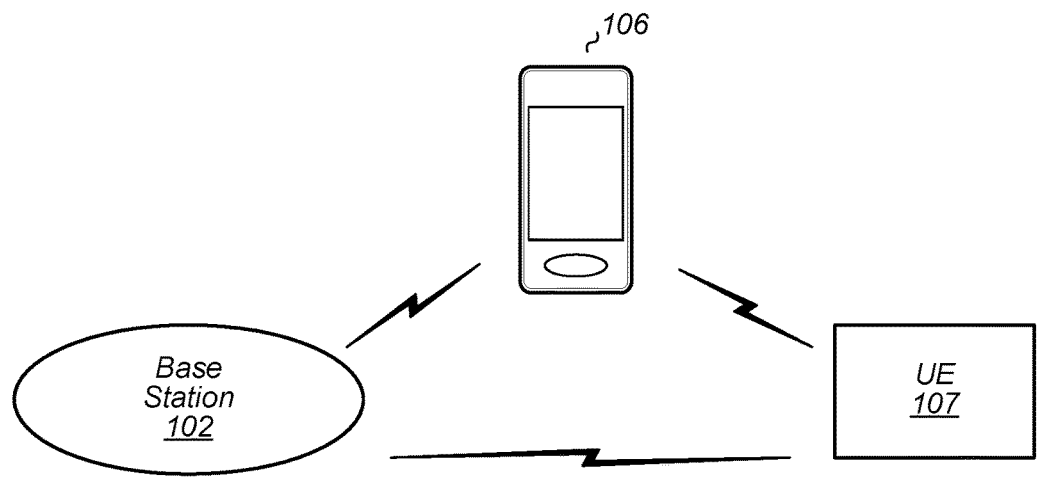
FIG. 2 illustrates an example system in which a UE can selectively either directly communicate with a cellular base station or utilize the cellular capabilities of a companion or proxy device such as another UE, according to some embodiments.

FIGS. 1 and 2—Communication System

FIG. 1 illustrates a simplified example wireless communication system, according to one embodiment. It is noted that the system of FIG. 1 is merely one example of a possible system, and that features of this disclosure may be implemented in any of various systems, as desired.

As shown, the example wireless communication system includes a base station 102A which communicates over a transmission medium with one or more wireless devices 106A, 106B, etc., as well as accessory device (or accessory UE) 107. Wireless devices 106A, 106B, and 107 may be user devices, which may be referred to herein as "user equipment" (UE) or UE devices.

The base station (BS) 102A may be a base transceiver station (BTS) or cell site (a "cellular base station"), and may include hardware that enables wireless communication with wireless devices 106A, 106B, and 107.

The communication area (or coverage area) of the base station may be referred to as a "cell." The base station 102A and the UEs 106/107 may be configured to communicate over the transmission medium using any of various radio access technologies (RATs), also referred to as wireless communication technologies, or telecommunication standards, such as 5G new radio (5G NR), GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106/107 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106/107 and similar devices over a wide geographic area via one or more cellular communication standards.

Thus, while base station 102A may act as a "serving cell" for UEs 106/107 as illustrated in FIG. 1, each UE 106/107 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106/107 may be capable of communicating using multiple wireless communication standards. For example, UE 106/107 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), 5G NR, LTE, LTE-A, HSPA, 3GPP2 CDMA2000 (e.g., 1×RTT, 1×EV-DO, HRPD, eHRPD), etc.). UE 106/107 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

The UEs 106A and 106B are typically handheld devices such as smart phones or tablets, but may be any of various types of device with communication capability, such as cellular communications capability. The UE 106B may be configured to communicate with the UE device 107, which may be referred to as an accessory device 107. The accessory device 107 may be any of various types of devices, typically a wearable device that has a smaller form factor, and may have limited battery, output power and/or communications abilities relative to UEs 106. In other words, accessory device 107 may be referred to as a lower power device whereas UE 106 may be referred to as a higher power device. As one common example, the UE 106B may be a smart phone carried by a user, and the accessory device 107 may be a smart watch worn by that same user, or possibly a different user. Thus, as another example, the UE 106B may be a smart phone carried by a first user, and the accessory device 107 may be a smart watch worn by a second, different user. The UE 106B and the accessory device 107 may communicate using any of various short-range communication protocols, such as Bluetooth, Wi-Fi, etc.

The accessory device 107 includes communications capability, e.g., cellular communication capability, and hence is able to directly communicate with cellular base station 102. However, since the accessory device 107 is possibly limited in one or more of its communication capabilities, output power, and/or battery, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2—Example System with Accessory Device

FIG. 2 illustrates an example accessory device 107 in communication with base station 102. The accessory device 107 may be a wearable device such as a smart watch or band.

The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short-range communications protocol, and may then use the cellular functionality of this proxy device for communicating cellular voice/data with the base station 102. In other words, the accessory device 107 may provide voice/data packets intended for the base station 102 over the short-range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short-range link to the accessory device. As noted above, the UE 106 may be a mobile phone, a tablet, or any other type of handheld device, a media player, a computer, a laptop or virtually any type of wireless device. When the accessory device 107 is configured to indirectly communicate with the base station using the cellular functionality of an intermediate or proxy device, the accessory device may be said to be in "relay mode."

The various embodiments herein are described with respect to the accessory device 107 selectively using either its own cellular functionality (autonomous mode) to communicate with a base station, or using the cellular functionality of the UE 106 (relay mode) for communications, e.g., for LTE or VoLTE. However, embodiments described herein may also be used with other radio access technologies (RATs), such as to enable the accessory device 107 to selectively using either its own Wi-Fi functionality (autonomous mode) to communicate with a Wi-Fi access point, or use the Wi-Fi functionality of the UE 106 (relay mode) for Wi-Fi communications.

The accessory device 107 may include a processor that is configured to execute program instructions stored in memory. The accessory device 107 may perform any of the method embodiments described herein by executing such stored instructions. Alternatively, or in addition, the accessory device 107 may include a processing element, such as a programmable hardware element such as an FPGA (field-programmable gate array), integrated circuit (IC), or other circuitry, that is configured to perform any of the method embodiments described herein, or any portion of any of the method embodiments described herein.

The accessory device 107 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of 5G NR, LTE (or LTE-Advanced) or Bluetooth, and separate radios for communicating using each of 5G NR, LTE-Advanced and Bluetooth. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone, e.g., accessory device 107 may be a lower power device or link budget limited device. As noted above, in some embodiments, the accessory device 107 is a smart watch or other type of wearable device. As another example, the accessory device 107 may be a tablet device, such as an iPad, with Wi-Fi capabilities (and possibly limited or no cellular communication capabilities) that is not currently near a Wi-Fi hotspot and hence is not currently able to communicate over Wi-Fi with the Internet. Thus, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
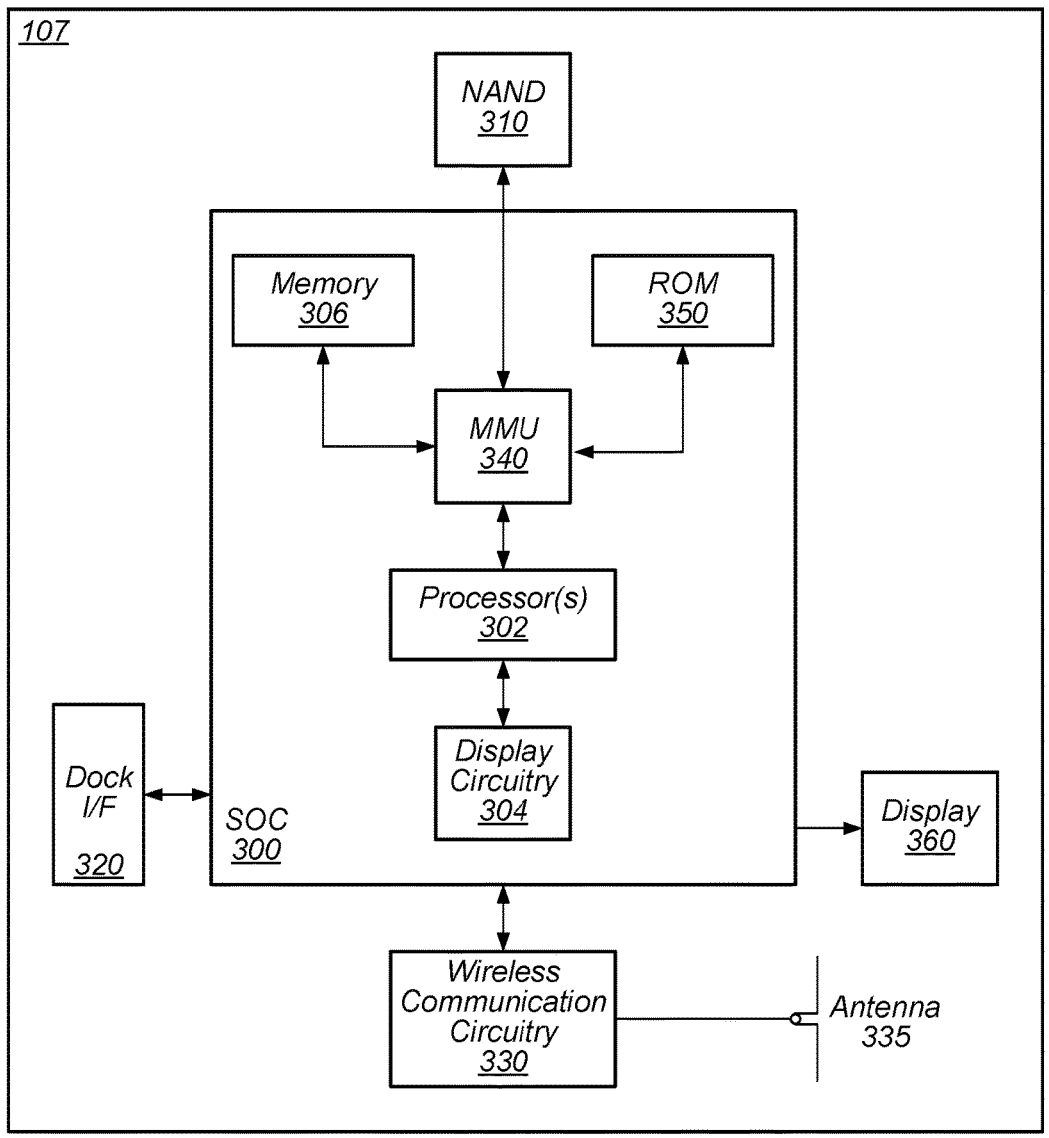
FIG. 3 illustrates an example block diagram of a UE according to some embodiments.

FIG. 3—Block Diagram of a UE

FIG. 3 illustrates an example block diagram of a UE 107, according to some embodiments. As shown, the UE 107, which may be an accessory device as described above, may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 107. For example, the UE 107 may include various types of memory (e.g., including NAND flash 310), a connector interface 320 (e.g., for coupling to a computer system, dock, charging station, etc.), the display 360, and wireless communication circuitry 330 (e.g., for 5G NR, LTE, LTE-A, CDMA2000, Bluetooth, Wi-Fi, GPS, etc.).

As shown, the UE device 107 may include at least one antenna (and possibly multiple antennas, e.g., for MIMO and/or for implementing different wireless communication technologies, among various possibilities) for performing wireless communication with base stations, access points, and/or other devices. For example, the UE device 107 may use antenna 335 to perform the wireless communication.

The UE 107 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 107 may include hardware and software components for implementing methods according to embodiments of this disclosure. The processor 302 of the UE device 107 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 107, in conjunction with one or more of the other components 300, 304, 306, 310, 320, 330, 335, 340, 350, 360 may be configured to implement part or all of the features described herein, such as the features described herein.

Figure 4:
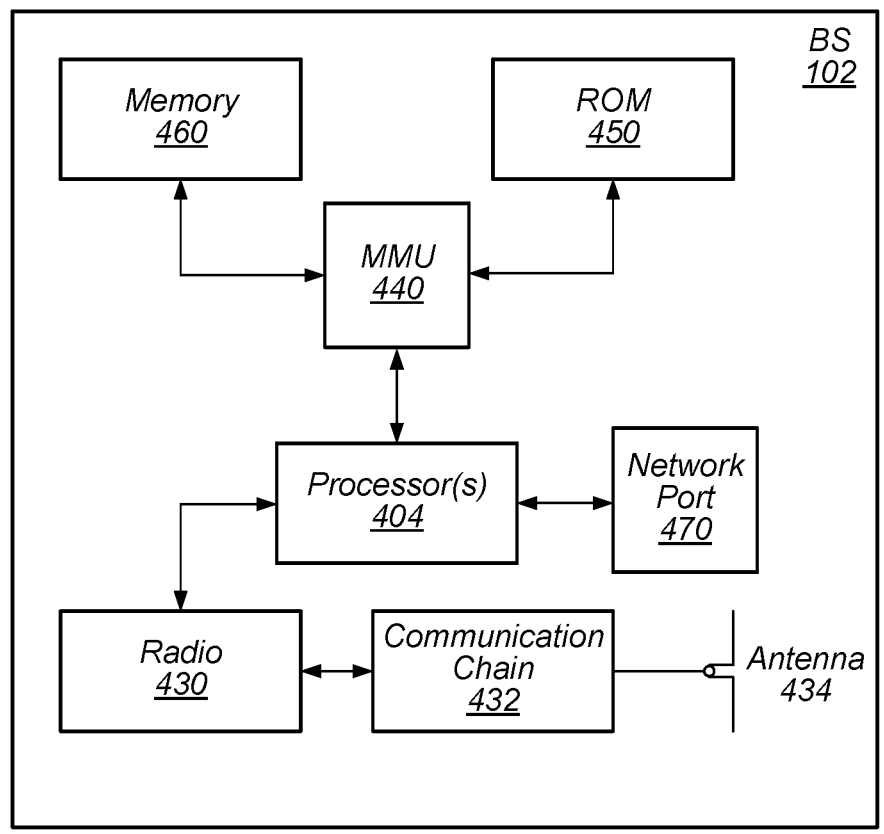
FIG. 4 illustrates an example block diagram of a BS according to some embodiments.

FIG. 4—Block Diagram of a Base Station

FIG. 4 illustrates an example block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE/5G NR radio for performing communication according to LTE/5G NR as well as a Wi-Fi radio for performing communication according to Wi-Fi. In such a case, the base station 102 may be capable of operating as both an LTE/5G NR base station and a Wi-Fi access point. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Cellular System Selection in Roaming

In some existing implementations, lower power (link budget limited, or accessory) devices, e.g., such as small form factor UEs and/or wearable devices, may provide cellular service while operating in a stand alone mode while (or in) roaming, e.g., at power-up and/or during a loss of coverage. However, lower power devices may have both an RF impairment limitation (e.g., due to form factor and/or available power) and/or a power limitation due to small battery size given the lower power device's smaller form factor. Thus, in some scenarios, e.g., while roaming, registration attempt failures leading to additional band scans may be more costly, e.g., as compared to standard sized or higher power UEs such as an iPhone or iPad, due to limited available power. In some roaming scenarios, initial registration failures can be due to incomplete or no operator preferred public land mobile network (O-PLMN) entries for a given roaming country and additional band scans may occur based on a rejected cause of a registration attempt of a visiting PLMN (V-PLMN).

In some existing implementations, a device may scan for a last registered PLMN (R-PLMN) on all possible bands and radio access technologies (RATs) upon determining that the device is without service (e.g., in a roaming scenario). Further, when an R-PLMN is not available, lower layers may provide an available PLMN list and the device may select a most preferred PLMN from the available PLMN list. The device may then scan the most preferred PLMN for available frequencies and attempt to register on the most preferred PLMN. In some instances, registration on the most preferred PLMN may fail and/or be rejected by the network for various reasons. In such instances, the device may then initiate another band scan depending on rejection and/or failure cause.

For example, if device registration is rejected by the network due to no suitable cells in a location area (LA), a routing area (RA), and/or a tracking area (TA), e.g., cause #15 as described in section 4.4.4.7 of 3GPP 24.008 V13.7.0, the device may add the LA/RA/TA to a forbidden LA/RA/TA list and may initiate a new band scan to search for non-forbidden LA/TA/RA of the same PLMN. As another example, if device registration is rejected by the network due to the LA not being allowed (or authorized), e.g., cause #12 as described in section 4.4.4.7 of 3GPP 24.008 V13.7.0, the device may add the LA/RA/TA to the forbidden LA/RA/TA list and may initiate a new band scan to look for non-forbidden LA/RA/TA of the same PLMN. As a further example, if device registration is rejected by the network due to the PLMN not being allowed (or authorized), e.g., cause #11 as described in section 4.4.4.7 of 3GPP 24.008 V13.7.0, the device may add the PLMN to a forbidden PLMN list and may initiate a new band scan by selecting a next preferred PLMN from the available PLMN list.

As yet another example, if device registration is rejected by the network due to roaming not being allowed in the LA, e.g., cause #13 as described in section 4.4.4.7 of 3GPP 24.008 V13.7.0, the device may add the LA/RA/TA to a forbidden LA/RA/TA list and may initiate a new band scan by selecting a next preferred PLMN from the available PLMN list. Further, if device registration fails due to other causes such as "temporary lower layer failures" and/or a network failure, e.g., cause #17 as described in section 4.4.4.7 of 3GPP 24.008 V13.7.0, the device may re-attempt registration up to a specified number of times (e.g., 5 additional attempts) on the LA/RA/TA and then, if registration has been unsuccessful, the device may initiate a new band scan to find a new available PLMN list.

Thus, in current implementations, registration failures while roaming typically lead to a new band scan. However, due to power constraints for lower power devices, lower power devices may not have sufficient power to perform the repeated band scans. Therefore, embodiments describe herein relate to techniques for limiting band scans while roaming by intelligently utilizing band scan and registration failure results to narrow scan scope upon a registration failure.

Scan Scope while Roaming

In some embodiments, scan scope while (during) roaming may be based, at least in part, on a list of preferred PLMNs (P-PLMNs). For example, an O-PLMN and/or a P-PLMN list may be programmed with possible roaming PLMNs for a given (or particular) operator. In some embodiments, the possible roaming PLMNs may be operator provided. In some embodiments, the possible roaming list may be augmented (either partially or fully) via a push operation, e.g., an operator may push (e.g., transmit without solicitation) an updated or new P-PLMN list to a device via an activation server and/or a push server. In some embodiments, a device (e.g., such as UEs 106 and 107 described above) may limit registration attempts to the O-PLMN and/or the P-PLMN (e.g., as provided by the operator and/or as augmented via the push operation) thereby minimizing occurrences of rejection.

In some embodiments, in addition to (or alternatively to) basing scan scope while roaming on a list of P-PLMNs, a device (e.g., such as UEs 106 and 107 described above), may build (or develop) a new database that may include last seen (or last found) frequencies, e.g., a last seen frequency database (LSFD). For example, during a power-up or loss of coverage scenario (or event), a device may scan for a last registered PLMN (R-PLMN) on substantially all possible bands and RATs, e.g., a device may perform a full band scan. During the scan, the device may add found cells that do not belong to the R-PLMN to a database, e.g., and LSFD. The database may include for a cell not in the R-PLMN any or all of a PLMN associated with the cell, RAT of the cell, frequency, bandwidth, band information, scrambling code, physical cell identifier (ID), signal strength, and so forth. At the conclusion of the scan, if the R-PLMN is not available, the device may trigger (or perform) a scan based on the database, e.g., by choosing a most preferred PLMN from an available PLMN list based on contents of the database, filtering frequencies for a chosen PLMN based on contents of the database, and sorting the filtered frequencies based on signal strength. In other words, the device may use results collected from an initial band scan to prioritize scans for a new cell. Note that in some embodiments, if the device exhausts the database without successfully registering on a cell, the device may clear (delete) contents of the database to avoid using unsuccessful contents for a new scan. Note that such a technique may avoid multiple band scans in a roaming scenario and may additionally utilizes scan results more effectively.

For example, in some embodiments, if device registration is rejected by the network due to no suitable cells in a location area (LA), a routing area (RA), and/or a tracking area (TA), e.g., cause #15 as described in section 4.4.4.7 of 3GPP 24.008 V13.7.0, a device (e.g., such as UEs 106 and 107 described above) may add the LA/RA/TA to a forbidden LA/RA/TA list and may initiate a stored list scan based on an LSFD created during the initial band scan to search for non-forbidden LA/TA/RA of the same PLMN. As another example, in some embodiments, if device registration is rejected by the network due to the LA not being allowed (or authorized), e.g., cause #12 as described in section 4.4.4.7 of 3GPP 24.008 V13.7.0, the device may add the LA/RA/TA to the forbidden LA/RA/TA list and may initiate a stored list scan based on an LSFD created during the initial band scan to look for non-forbidden LA/RA/TA of the same PLMN. As a further example, in some embodiments, if device registration is rejected by the network due to the PLMN not being allowed (or authorized), e.g., cause #11 as described in section 4.4.4.7 of 3GPP 24.008 V13.7.0, the device may add the PLMN to a forbidden PLMN list and may initiate a stored list scan based on an LSFD created during the initial band scan by selecting a next preferred PLMN from the available PLMN list.

As yet another example, in some embodiments, if device registration is rejected by the network due to roaming not being allowed in the LA, e.g., cause #13 as described in section 4.4.4.7 of 3GPP 24.008 V13.7.0, the device may add the LA/RA/TA to a forbidden LA/RA/TA list and may initiate a stored list scan based on an LSFD created during the initial band scan by selecting a next preferred PLMN from the available PLMN list. Further, in some embodiments, if device registration fails due to other causes such as "temporary lower layer failures" and/or a network failure, e.g., cause #17 as described in section 4.4.4.7 of 3GPP 24.008 V13.7.0, the device may re-attempt registration up to a specified number of times (e.g., 5 additional attempts) on the LA/RA/TA and then, if registration has been unsuccessful, the device may initiate a stored list scan based on an LSFD created during the initial band scan to find a new available PLMN list.

Note that although the embodiments described herein have been described in reference to a lower power device (e.g., an accessory device), the embodiments may be implemented on any type of device. In other words, the embodiments described herein are not limited to lower power devices and may be implemented on standard form factor devices as described above.

Figure 5:
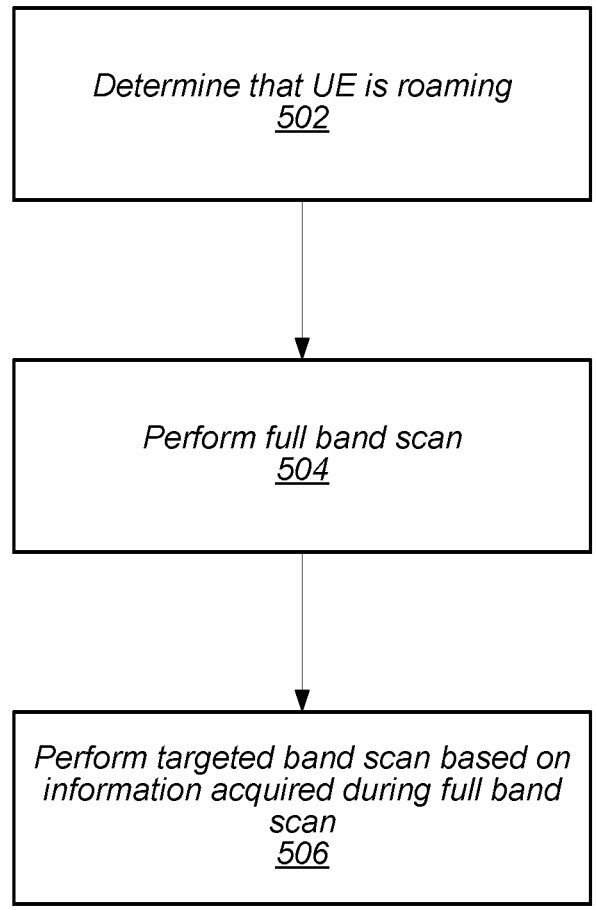
FIG. 5 is a flowchart diagram illustrating an example of a method to determine scan scope while roaming, according to some embodiments.

FIG. 5—Flowchart Diagram

FIG. 5 is a flowchart diagram illustrating an example of a method to determine scan scope while roaming, according to some embodiments. The method shown in FIG. 5 may be used in conjunction with any of the systems or devices shown in the above Figures, among other devices. In addition, the method shown in FIG. 5 may be used in conjunction with any of the embodiments and/or techniques described above. In various embodiments, some of the method elements shown may be performed concurrently, in a different order than shown, or may be omitted. Additional method elements may also be performed as desired. As shown, this method may operate as follows.

At 502, the UE (e.g., UE 107 or UE 106) may determine that the UE is in a roaming condition (e.g., outside of an operator network). For example, the UE may determine that the UE does not have cellular service and may then determine a last registered public land mobile network (PLMN) the UE was camped on (or registered on).

At 504, the UE may perform a full band scan in response to determining that the UE is in a roaming condition. The full band scan may be performed to find (or search for) the last registered PLMN. In some embodiments, the full band scan may discover one or more cells not associated with the last registered PLMN. In such embodiments, the UE may populate a database with one or more parameters associated with the one or more cells. For example, for a cell, a database entry may include any or all of (e.g., one or more of) a PLMN identifier associated with the cell, a frequency associated with the cell, a bandwidth associated with the cell, a scrambling code associated with the cell, a physical cell identifier of the cell, and/or a signal strength measured from signals received from the cell.

At 506, the UE may perform a targeted band scan based on information acquired during the full band scan. In some embodiments, the targeted band scan may be performed in response to the last registered PLMN not being available (e.g., found and/or within communication range of the UE). In some embodiments, the information acquired during the full band scan may be stored in a database in a memory of the UE. In some embodiments, a scope of the targeted band scan may be based, at least in part, on at least one parameter stored in the database (e.g., a parameter of a cell stored in the database). In some embodiments, the UE may determine the scope of the targeted band scan by sorting (or filtering) the information in the database (e.g., the one or more parameters) based on one or more criteria. For example, the UE may first select cells associated with a list of preferred PLMNs. The list of preferred PLMNs may include a list of roaming PLMNs for an operator. The UE may then filter frequencies associated with the selected cells (e.g., the UE may select frequencies based on capabilities of the UE, in other words, the UE may filter out frequencies the UE is not capable or configured to operate on). The UE may further prioritize the remaining cells based on received signal strength, e.g., the UE may scan cells with higher received signal strength prior to scanning cells with lower received signal strength as calculated based on the full band scan. In other words, the targeted band scan (or targeted scan) may be limited to a set of frequencies associated with PLMNs found during the full band scan and frequencies within the set of frequencies may be prioritized based on received signal strength as determined during the full band scan.

In some embodiments, the UE may attempt to register on a cell discovered during the targeted band scan. In some embodiments, if the attempt to register on the cell fails, the UE may attempt to register on another cell discovered (found) during the targeted band scan. In some embodiments, if the UE exhausts all cells found during the targeted band scan (e.g., the UE fails to register on any of the cells discovered during the targeted band scan) the UE may delete the information associated with the cells discovered during the targeted band scan and stored in the database. Similarly, if no cells are discovered during the targeted band scan, the UE may delete the information associated with the cells and stored in the database.

In some embodiments, prior to performing the targeted band scan, the UE may limit registration attempts to a preferred PLMN list. In some embodiments, the preferred PLMN list may be based on (or include) a list of roaming PLMNs for an operator. In some embodiments, the preferred PLMN list may be populated (or generated) or updated via a profile download process and/or a push operation via an activation server. In some embodiments, the list of roaming PLMNs for an operator may be populated (or generated) or updated via a profile download process and/or a push operation via an activation server.

In some embodiments, the targeted band scan scope may be based on a failure condition of a last registration attempt. In such embodiments, the UE may scan for a particular PLMN. For example, in some embodiments, if the UE's registration attempt is rejected due to no suitable cells in a location area (LA), a routing area (RA), and/or a tracking area (TA), e.g., cause #15 as described in section 4.4.4.7 of 3GPP 24.008 V13.7.0, the UE may search for non-forbidden LA/TA/RA of the same PLMN. As another example, in some embodiments, if the UE's registration attempt is rejected due to the LA not being allowed (or authorized), e.g., cause #12 as described in section 4.4.4.7 of 3GPP 24.008 V13.7.0, the UE may search for non-forbidden LA/RA/TA of the same PLMN. As a further example, in some embodiments, if the UE's registration attempt is rejected due to the PLMN not being allowed (or authorized), e.g., cause #11 as described in section 4.4.4.7 of 3GPP 24.008 V13.7.0, the UE may select a next preferred PLMN from the available PLMN list and scan the next preferred PLMN.

As yet another example, in some embodiments, if the UE's registration attempt is rejected due to roaming not being allowed in the LA, e.g., cause #13 as described in section 4.4.4.7 of 3GPP 24.008 V13.7.0, the UE may select a next preferred PLMN from the available PLMN list and scan the next preferred PLMN. Further, in some embodiments, if the UE's registration attempt is rejected due to other causes such as "temporary lower layer failures" and/or a network failure, e.g., cause #17 as described in section 4.4.4.7 of 3GPP 24.008 V13.7.0, the UE may re-attempt registration up to a specified number of times (e.g., 5 additional attempts) on the LA/RA/TA and then, if registration has been unsuccessful, the UE may search for a new available PLMN list.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:
at least one antenna for performing wireless communications;
a radio coupled to the at least one antenna; and
a processing element coupled to the radio;
wherein the processing element is configured to cause the UE to:
determine that the UE is in a roaming condition;
perform a full band scan to search for a last registered public land mobile network (PLMN), wherein the full band scan discovers one or more cells not associated with the last registered PLMN, wherein for each of the one or more cells, the processing element is further configured to cause the UE to populate a database with one or more parameters associated with the one or more cells; and
perform, in response to the last registered PLMN not being available, a targeted band scan based on the database, wherein the processing element is further configured to cause the UE to:
limit registration attempts to a preferred PLMN list prior to performance of the targeted band scan; and
determine a scope of the targeted band scan based on at least one of the one or more parameters associated with the one or more cells, wherein to determine the scope, the processing element is further configured to:
determine one or more cells to scan based on the one or more parameters;
filter frequencies associated with the one or more cells to scan; and
prioritize the one or more cells based in part on signal strength.

2. The UE of claim 1,
wherein the one or more parameters comprise one or more of:
a PLMN identifier associated with a cell;
a frequency associated with a cell;
a bandwidth of a cell;
a scrambling code;
a physical cell identifier; or
signal strength.

3. The UE of claim 1,
wherein the one or more cells to scan are associated with a preferred public land mobile network (PLMN) list comprising roaming PLMNs for an operator.

4. The UE of claim 1,
wherein the processing element is further configured to cause the UE to:
attempt to register on at least one cell discovered during the targeted band scan.

5. The UE of claim 1,
wherein, in response to one of not discovering any cells during the targeted band scan or not completing a successful registration attempt based on the targeted band scan, the processing element is further configured to cause the UE to delete the contents of the database.

6. The UE of claim 1,
wherein the preferred PLMN list comprises roaming PLMNs for an operator.

7. The UE of claim 6,
wherein the preferred PLMN list is populated via at least one of:
a profile download process; or
a push operation via an activation server.

8. An apparatus, comprising:
a memory; and
a processing element in communication with the memory, wherein the processing element is configured to:
in response to detecting that a user equipment device (UE) does not have cellular service, perform a full band scan to search for a last registered public land mobile network (PLMN), wherein the full band scan discovers one or more cells not associated with the last registered PLMN;
populate a database with one or more parameters associated with the one or more cells; and
in response to not finding the last registered PLMN, perform a targeted scan limited to a set of PLMNs found during the full band scan, wherein each PLMN in the set of PLMNs is comprised in a roaming PLMN list for an operator and wherein to perform the targeted scan, the processing element is further configured to:
filter the set of PLMNs based in part on frequencies found; and
prioritize the found frequencies based on signal strength.

9. The apparatus of claim 8,
wherein, to prioritize the found frequencies based on signal strength, the processing element is further configured to:
prioritize the found frequencies such that frequencies having a higher signal strength will be scanned prior to frequencies having a lower signal strength.

10. The apparatus of claim 8,
wherein the one or more parameters comprise one or more of:
a public land mobile network identifier associated with a cell;
a frequency associated with a cell;
a bandwidth of a cell;
a scrambling code;
a physical cell identifier; or
signal strength.

11. The apparatus of claim 10,
wherein, in response to one of not discovering any cells during the targeted scan or not completing a successful registration attempt based on the targeted scan, the processing element is configured to delete the contents of the database.

12. The apparatus of claim 8,
wherein the processing element is further configured to attempt to register on at least one cell discovered during the targeted scan.

13. The apparatus of claim 8,
wherein the preferred PLMN list is populated via at least one of:
a profile download process; or
a push operation via an activation server.

14. A non-transitory computer accessible memory medium comprising program instructions which, when executed at a wireless user equipment (UE) device, cause the UE to:
in response to determining that the UE is in a roaming condition, perform a full band scan to search for a last registered public land mobile network (PLMN), wherein the full band scan discovers one or more cells not associated with the last registered PLMN;
populate a database with one or more parameters associated with the one or more cells, wherein the one or more parameters comprise signal strength;
limit, prior to performance of a targeted band scan based on the database, registration attempts to a preferred PLMN list; and
perform, in response to the last registered PLMN not being available, the targeted band scan based on the database, wherein to determine a scope of the targeted band scan, the program instructions are further executable to:
determine one or more cells to scan based on the one or more parameters;
filter frequencies associated with the one or more cells to scan; and
prioritize the one or more cells based in part on the signal strength.

15. The non-transitory computer accessible memory medium of claim 14,
wherein the one or more parameters further comprise one or more of:
a PLMN identifier associated with a cell;
a frequency associated with a cell;
a bandwidth of a cell;
a scrambling code;
a physical cell identifier; or
signal strength.

16. The non-transitory computer accessible memory medium of claim 14,
wherein to determine the scope of the targeted band scan, the program instructions are further executable to cause the UE to:
determine one or more cells to scan based on the one or more parameters, wherein the one or more cells to scan are associated with a preferred public land mobile network (PLMN) list comprising roaming PLMNs for an operator;
filter frequencies associated with the one or more cells to scan; and
prioritize the one or more cells based in part on signal strength.

17. The non-transitory computer accessible memory medium of claim 14,
wherein the program instructions are further executable to cause the UE to:
attempt to register on at least one cell discovered during the targeted band scan.

18. The non-transitory computer accessible memory medium of claim 14,
wherein, in response to one of not discovering any cells during the targeted band scan or not completing a successful registration attempt based on the targeted band scan, the program instructions are further executable to cause the UE to delete the contents of the database.

19. The non-transitory computer accessible memory medium of claim 14,
wherein, prior to performance of the targeted band scan, the program instructions are further executable to cause the UE to:
limit registration attempts to a preferred PLMN list, wherein the preferred PLMN list comprises roaming PLMNs for an operator.

20. The non-transitory computer accessible memory medium of claim 19,
wherein the preferred PLMN list is populated via at least one of:
a profile download process; or
a push operation via an activation server.

* * * * *